Oct. 8, 1935.　　　　　K. SIEG　　　　2,016,581

MEASURING DEVICE

Filed Feb. 21, 1933　　5 Sheets-Sheet 1

INVENTOR
*Karl Sieg*
BY
ATTORNEYS

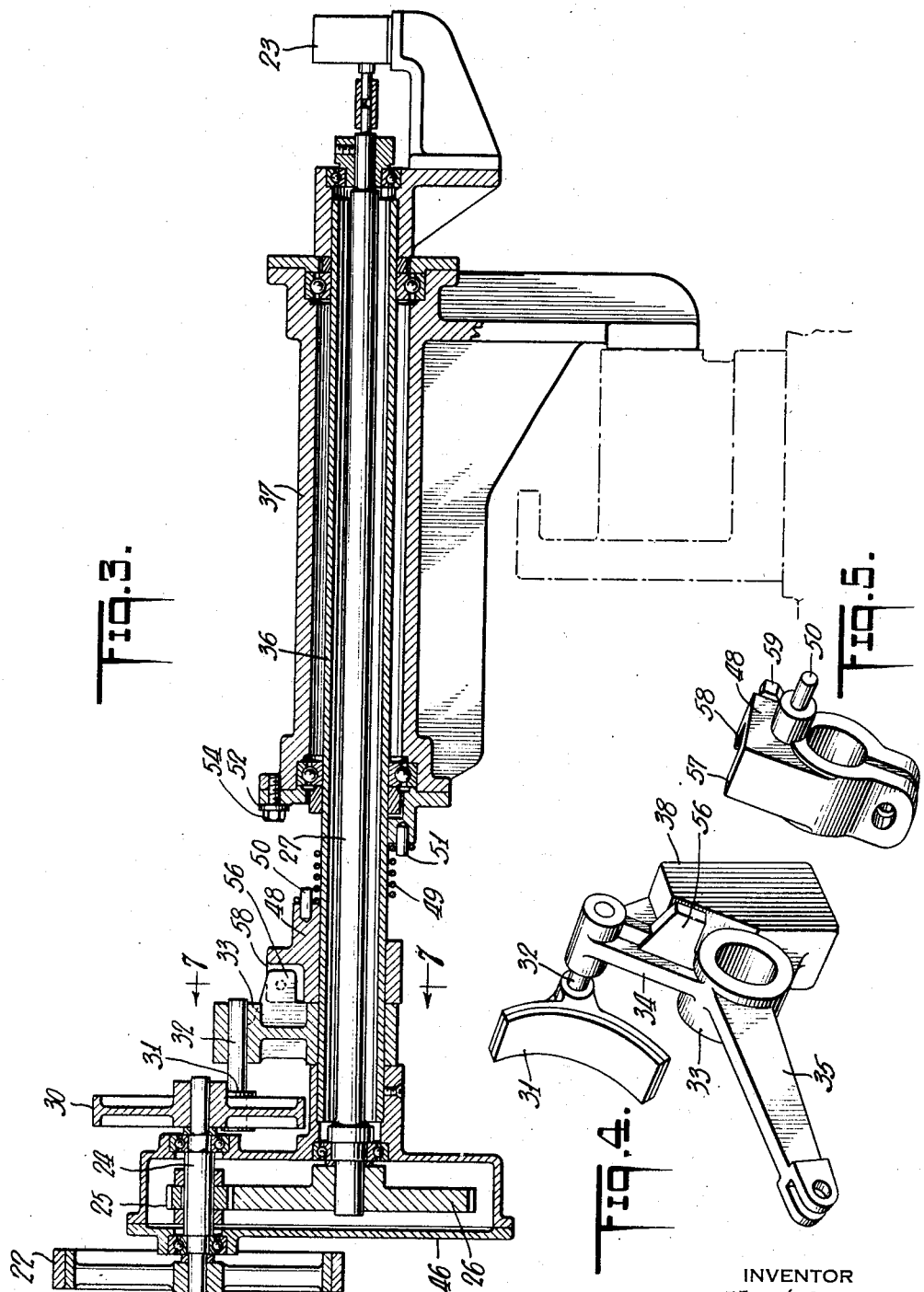

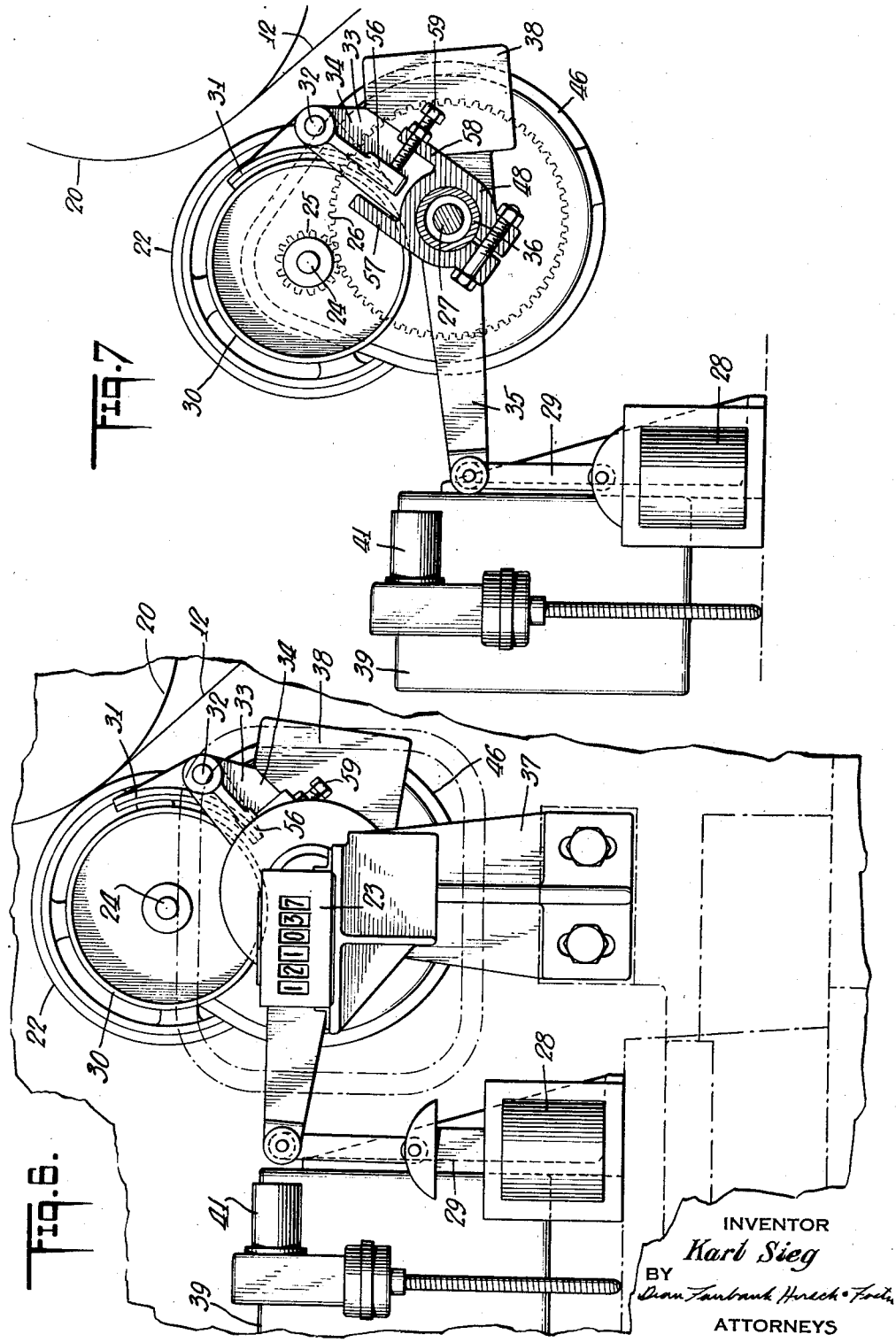

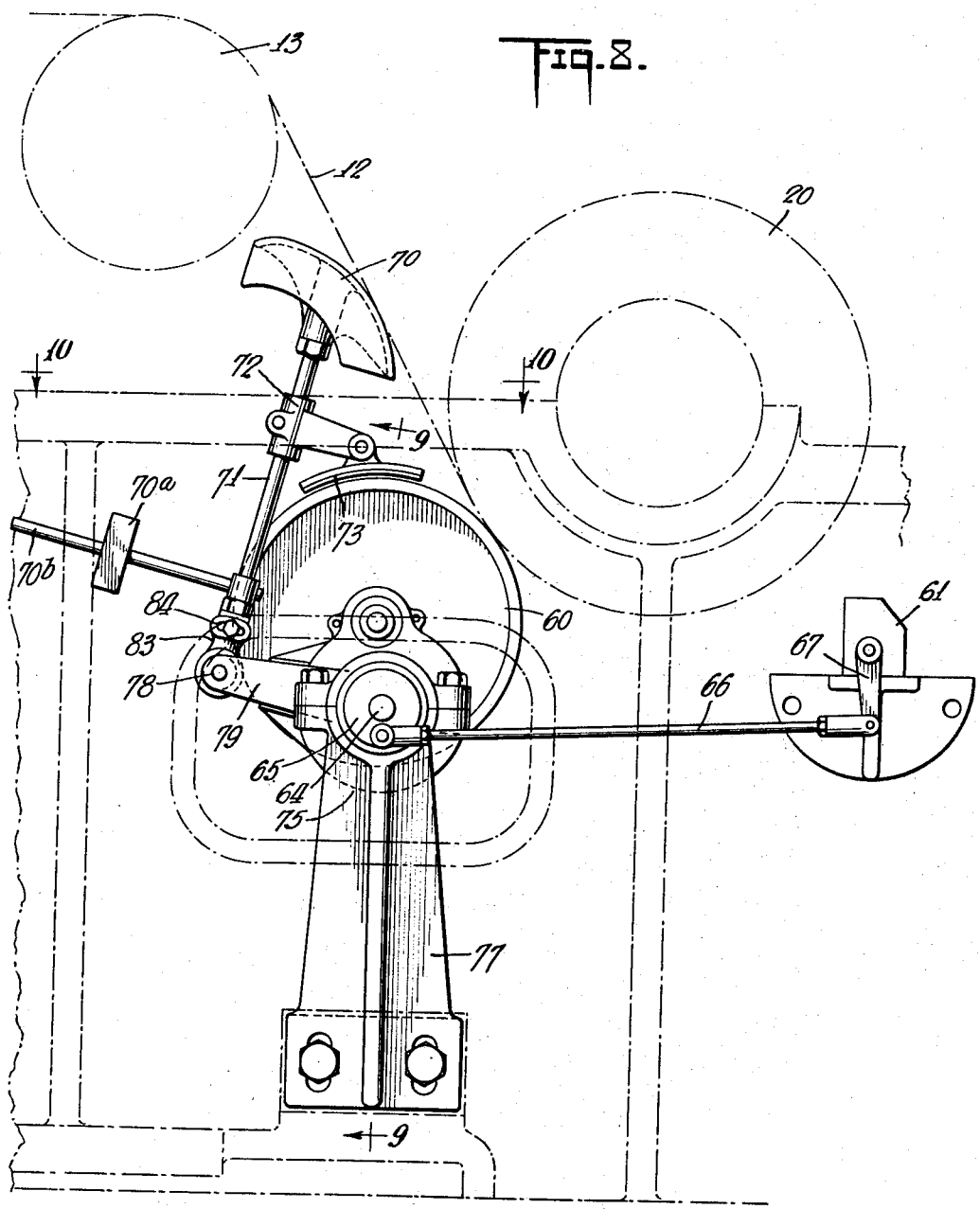

Oct. 8, 1935.　　　　　　K. SIEG　　　　　　2,016,581
MEASURING DEVICE
Filed Feb. 21, 1933　　　5 Sheets-Sheet 5
Fig. 9.
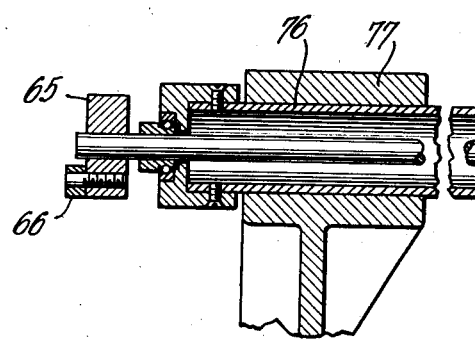
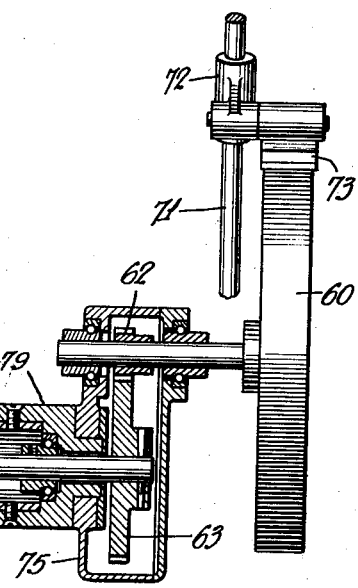
Fig. 10.
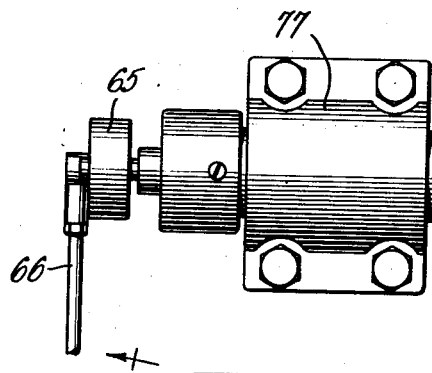
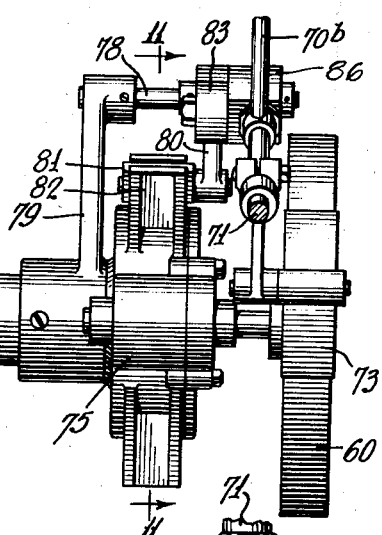
Fig. 11.
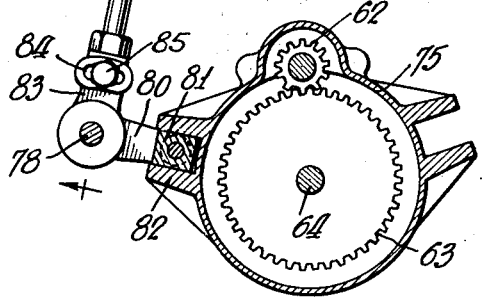
Fig. 12.
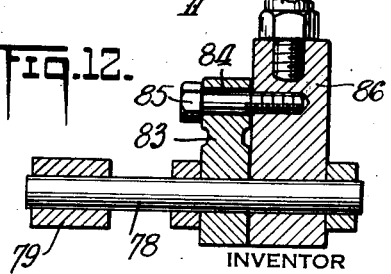
INVENTOR
*Karl Sieg*
BY
ATTORNEYS Patented Oct. 8, 1935

2,016,581

UNITED STATES PATENT OFFICE 2,016,581

MEASURING DEVICE

Karl Sieg, Philadelphia, Pa., assignor to Samuel M. Langston Co., Camden, N. J., a corporation of New Jersey Application February 21, 1933, Serial No. 657,777

12 Claims. (Cl. 33—129)

Rolls of paper for many purposes are sold as containing a given number of linear feet of paper. A properly calibrated counter operated by a rotatable member driven at a speed corresponding to the speed of travel of the paper in a winder, does not correctly register the length of the wound paper in case the paper breaks or the end of the sheet is reached, because the winder ordinarily cannot be stopped instantly when such break occurs or such end is reached, and the counter will continue to operate after the supply to the roll stops.

One object of the present invention is to provide a measuring device which accurately registers the length of paper wound upon a roll, and which automatically stops registering when the continuity of the paper in the winder is broken.

As an important feature of the present invention, the counter is automatically disconnected from its source of power when the continuity of the paper is broken, as for instance when the end of the paper is reached or when the paper is accidentally broken.

As another important feature, means are provided for stopping the rotatable member the instant it is disengaged from its drive. For that purpose, a brake is provided which acts instantly and automatically to stop the further rotation of said rotatable member when the continuity of the paper is broken.

More specifically, the invention includes a counter wheel engaging the paper so as to be rotated thereby, and operatively connected to the counter. This counter wheel is so mounted that it may be automatically and instantly bodily moved out of contact with the paper when it is desired to stop the counter.

A brake is also provided together with means for causing it to act on the counter at all times when the counter wheel is disconnected from its source of power, in this case the paper.

As one important feature, I provide an electric eye directed across the path of travel of the paper, and causing the actuation of power disconnecting and brake applying mechanisms when the supply of paper is interrupted.

As another alternative feature, I provide a feeler, finger or shoe engaging the paper and mechanically doing what might be done by the electric eye.

In the accompanying drawings, there are shown for the purposes of illustration, two forms embodying the present invention. In these drawings:

Fig. 3 is a section taken on the line 3—3 of Fig. 2.

Fig. 4 is a perspective view of a part of the brake.

Fig. 5 is a perspective view of a part cooperating with the brake.

Fig. 6 is a view similar to a part of Fig. 2, but on a larger scale, and showing the device in operating position.

Fig. 7 is a section taken on the line 7—7 of Fig. 3, and showing the measuring device in inoperative position.

Fig. 8 is an end view showing another form of measuring device embodying my invention.

Fig. 9 is a section taken on the line 9—9 of Fig. 8.

Fig. 10 is a top plan view of the form of measuring device shown in Fig. 8.

Fig. 11 is a section taken on the line 11—11 of Fig. 10, and

Fig. 12 is a section taken on the line 12—12 of Fig. 11.

Figure 1:
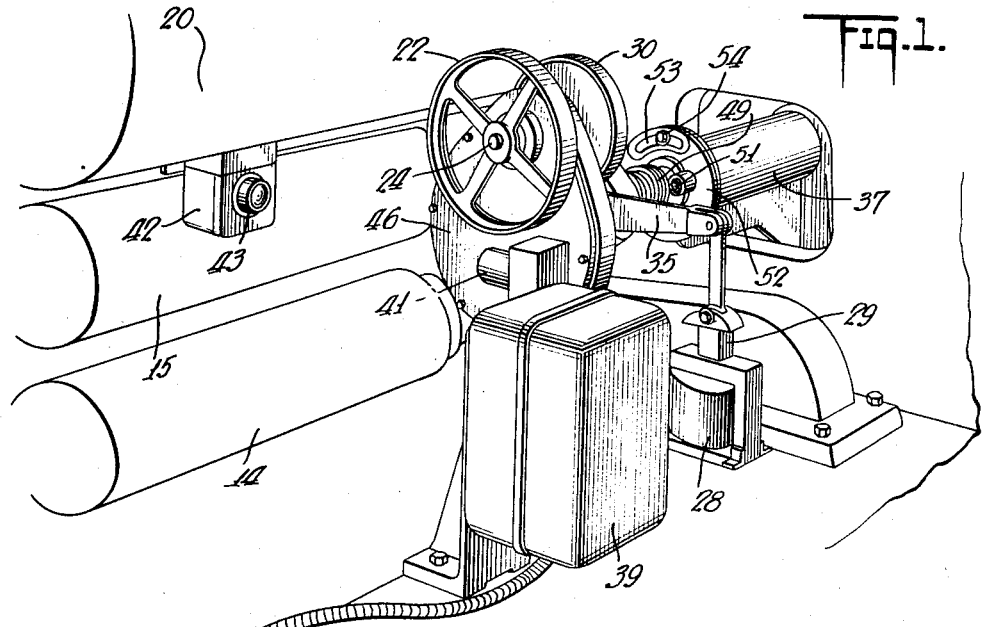
Fig. 1 is a perspective view showing one form of measuring device embodying my invention.

In a paper winding machine of the type shown, the paper 12 to be slit or trimmed and rewound, passes in contact with idler rollers 13 and 14, between a pair of cutters 15 and 16, and then to the roll 19 being formed. This roll is supported on and rotated by a pair of winding drums 17 and 20. Since the roll 19 is rotated by the drums 17 and 20, the drum 20 will have a peripheral speed substantially equal to the speed at which the paper 12 is traveling, and its surface adjacent to the run of paper between the idlers 13 and 14 will move in the same direction as the paper. Other details of such a machine are shown in my prior Patent No. 1,827,802, issued October 20, 1931.

The means for determining the length of paper wound includes a freely rotatable member driven by the winder at a peripheral speed corresponding to the linear speed of travel of the paper, and advantageously takes the form of a counter wheel 22. To prevent error due to slipping of the paper in the machine, it is important, but not in all cases essential, that this wheel be driven by the paper on its way to the roll 19. It is shown as disposed close to the drum 20, the paper 12 being threaded between said wheel and said drum, so that said wheel is frictionally driven by the moving paper and the rotating drum 20, and the wheel may be pressed against the paper as firmly as desired without altering the course of the paper.

A counter 23 is operated by the wheel 22, said wheel being mounted on a shaft 24 (see Fig. 3) which carries a pinion 25 meshing with a gear 26 fixed to one end of a shaft 27, the other end of the latter being operatively connected to the shaft of the counter 23.

In the specific form shown in Figs. 1 to 7, the means provided for automatically stopping the operation of the counter 23 when the continuity of the paper in the winder is broken, includes, as an important feature of the present invention, electrically operated means for moving the wheel away from the paper, and for applying a brake automatically for stopping the rotation of the wheel 22.

In the specific form shown, the brake comprises a brake drum 30 connected to the shaft 24 and cooperating with a brake shoe 31 (Fig. 4) mounted on a pin 32 journaled on one arm 34 of a bell crank lever 33. The hub of this brake lever is loosely mounted on a sleeve 36 supported by a fixed bracket 37 secured to the frame structure of the winding machine. The free end of the other arm 35 is pivotally connected to a link 29 connected to the armature of a solenoid 28. The lever 33 has a counterweight 38 which serves to normally urge the brake shoe 31 away from the periphery of the brake drum 30.

As an important feature of the present invention, there is provided a photoelectric device 39 which serves to open or close the electric circuit of the solenoid 28 in response to changes of illumination of the device effected by breaks in the continuity of the paper. The device 39 is disposed on one side of the line of travel of the paper 12, and is of standard type having a light responsive or photoelectric tube exposed through the opening of an eye or tube 41 axially extending transversely to the line of travel of the paper between the counter wheel 22 and the drum 30. Disposed on the other side of the paper 12 is a source of light 42 adapted to project light through a tube 43 extending in axial alinement with the tube 41. The details of this photoelectric device, the wiring circuits thereof, etc., form no portion of my invention and may be of any standard type.

The light 42 is continuously turned on, but during normal paper winding operation, the paper is interposed in the path of light rays, so that the photoelectric device is not actuated during this operation. When the paper breaks or the end thereof has reached the winding machine, the light rays from the source 42 will be projected into the electric eye or other photoelectric device, to actuate the same and operate a relay (not shown) in the circuit of the solenoid windings, thereby causing the energization of the solenoid. The link 29 is then forced downwardly and moves the brake lever 33 in a counterclockwise direction from the position shown in Figs. 4 and 6, into position to apply the brake shoe 31 firmly against the periphery of the brake drum 30 as shown in Fig. 7. By this operation, the further rotation of the wheel 22 is stopped.

The means for automatically stopping the operation of the counter 23 when the continuity of the paper in the winder is broken, also includes as an important feature of the present invention, means for automatically moving the wheel 22 away from its driving means. This includes a movable support 46 which advantageously serves as a gear casing for the gears 25 and 26, and which provides journals for the shaft 24. This casing 46 is movable about an axis spaced from the axis of rotation of the counter wheel 22, and is also spaced from the axis of the shaft 32, so that after the brake shoe 31 has been applied to the brake drum 30, further movement of the brake shoe, under the influence of the solenoid 28, will cause movement of the gear casing 46 about its axis of rotation and corresponding movement of the counter wheel 22 away from the path of travel of the paper. As shown, the casing 46 is secured to one end of the sleeve 36.

Figure 2:
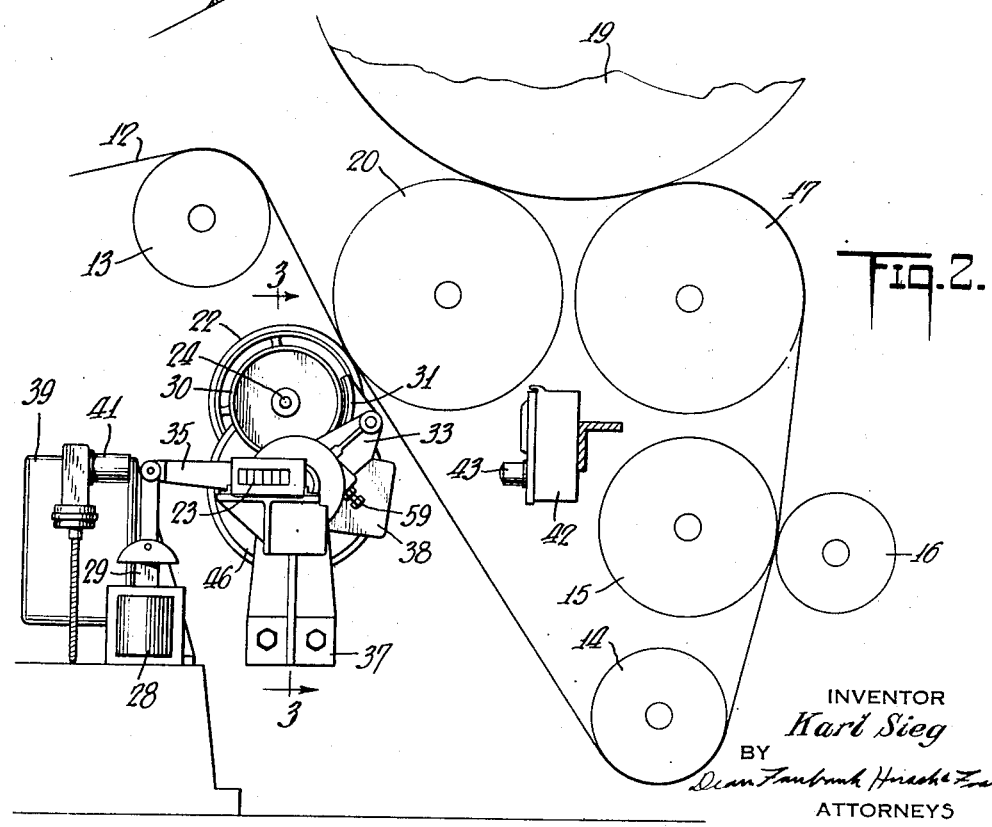
Fig. 2 is an end view of the form shown in Fig. 1, with the parts thereof in operative measuring position.

Means are provided for yieldably pressing the wheel 22 against the paper and the drum 20 during normal winding operations, and to provide lost motion between the drum and its brake shoe. This is shown as including a collar 48 clamped to the sleeve 36 and urged in a clockwise direction as shown in Figs. 2, 6 and 7, by yieldable means such as a coil spring 49 loosely encircling the sleeve 36, and having one end thereof engaging a stud pin 50 on the collar 48, and the other end connected to a stud pin 51 extending from some stationary part such as an end plate 52 on the bracket 37. The coil spring 49 serves not only to urge the counter wheel 22 against the paper during normal winding operations, but also serves to yieldably press said counter wheel against the brake shoe 31 in braking position, thereby increasing the effectiveness of the braking.

The end plate 52 is advantageously rotatably adjustable in respect to the bracket 37 to permit alteration of the tension of the spring 49. As shown in Fig. 1, the plate 52 has segmental slots 53 which receive bolts 54 threaded into the fixed bracket 37. The plate 52 also serves to hold one of the bearing elements which permits easy oscillation of the sleeve 36 in the bracket 37, as shown in Fig. 3.

The brake lever 33 is prevented from falling back too far under the influence of the counter weight 38 when the circuit of the solenoid 28 is broken. For that purpose, the brake lever 33 is provided with a lug 56 which extends between two spaced lugs 57 and 58 on the collar 48. The extent to which the brake lever 33 may fall back into inoperative position may be controlled by an adjusting screw 59 passing through the lug 58. With the brake lever 33 in inoperative position shown in Fig. 6, the lug 56 thereon will engage the end of the adjusting screw 59, and since the collar 48 is held in position by the engagement of the counter wheel 22 with the paper, the brake lever 33 will be prevented from moving away from the shoe, except to a limited distance. By means of this construction, the counter weight 38 serves not only to return the brake lever 33 into inoperative position after the solenoid has been deenergized, but also assists the coil spring 49 in yieldably pressing the wheel 22 against the paper.

The collar 48 and the spring 49 serve not only to yieldably press the counter wheel 22 against the paper, but also to effect quick, automatic return of the counter wheel 22 into measuring position upon deenergization of the solenoid 28.

In Figs. 8 to 12, there is shown mechanically operated means for effecting the automatic braking of the measuring wheel and the movement of said wheel from measuring position. In this construction, there is provided a counter wheel 60 which is frictionally driven by the traveling paper, and which operates a counter 61.

The power transmission means between the wheel 60 and the counter 61 includes a pinion 62 mounted on the shaft of the wheel 60 and meshing with a gear 63 connected to one end of a shaft 64. The other end of the shaft carries a crank 65 connected by a link 66 to an arm 67 on the counter 61. As the counter wheel 60 is rotated, the link is reciprocated and the arm 67 is oscillated to operate the counter 61.

As an important feature of the present invention, as embodied in the form shown in Figs. 8 to 12, the operation of the brake and the bodily movement of the counter wheel 60 is controlled by the movement of a feeler or shoe 70 yieldably urged into contact with the moving paper at a point along a free run of the paper. This feeler 70 may be spring-pressed into engagement with the paper during normal winding operation or may be heavy enough, as shown in the drawings, to be gravitated into engagement with said paper. It is connected to a rod 71 pivotally supported near its lower end at a point horizontally spaced from the normal position of said feeler to permit it to lean against or rest on the paper, as shown in Fig. 8.

The extent to which the feeler 70 presses against the paper 12 during measuring operation may be adjusted by means of a counterweight 70a slidable along a rod 70b connected to the rod 71, and fixed in any selective position along said rod 70b by any suitable means as for instance a set screw.

Connected to the rod 71 is a bracket 72 which pivotally supports a brake shoe 73 in close proximity to the periphery of the wheel 60. This brake shoe 73 is normally kept away from the periphery of the counter wheel 60 during measuring operations by the engagement of the feeler 70 with the surface of the paper. When the paper breaks or the end thereof passes the idler 13, the rod 71 will swing in a clockwise direction under the influence of said feeler as seen in Fig. 8, thereby causing the brake shoe 73 to instantly engage the counter wheel 60 and stop it.

For moving the counter wheel 60 away from the moving paper after the continuity of the paper has been broken, the shaft of the counter wheel 60 is journaled in a member 75 which is bodily movable about an axis eccentric with respect to the axis of rotation of the wheel 60. The member 75 is advantageously in the form of a casing enclosing the gears 62 and 63, and is supported near the end of a fixed sleeve 76, so as to be rotatable about the axis of said sleeve. This sleeve 76 encloses the shaft 64 and is supported in a fixed bracket 77 connected to the frame structure of the winding machine.

Means are provided for rotating the casing 75 about the axis of the sleeve 76 upon movement of the feeler 70 in a clockwise direction. For that purpose, there is provided a pivot shaft 78 journaled at the end of a fixed arm 79 connected to the sleeve 76. The rod 71 is connected near its lower end to said pivot shaft 78 so that when the paper fails to support the feeler 70 in the position shown in Fig. 8, said shaft will be rotated in a clockwise direction. This movement of the shaft 78 is transmitted to the casing 75 to rotate said casing about the sleeve 76, and move the counter wheel 60 away from the paper. For that purpose, there is fixed to the shaft 78 an arm 80, the outer end of which carries a shoe 81 disposed between a pair of spaced lugs 82 extending from the casing 75 so that the clockwise movement of said casing with respect to the sleeve 76 causes corresponding movement of the counter wheel 60 away from the path of movement of the paper. A similar pair of lugs may be provided on the other side of the casing 75 to permit the use of the device in either a right or left hand position.

By means of the construction shown in Figs. 8 to 12, when the paper breaks, the shoe falls forward and in doing so moves the counter or measuring wheel away, and moves the brake toward said wheel. The rod 71 will be moved in a clockwise direction, causing the casing 75 to be rotated in a counter-clockwise direction and the counter wheel 60 to move away from the path of travel of the paper. At the same time, the brake shoe 73 moves toward the periphery of the counter wheel 60. The counter wheel 60 will travel a very short distance before the brake shoe 73 is applied to the wheel 60.

Means are provided for effecting the proper adjustment of the shoe 70 against the paper. For that purpose, there is connected to the pivot shaft 78 a member 83 which may comprise part of the rod 71 or constitute a separate member, and which is provided with a segmental slot 84. Passing through this slot 84 is a bolt 85 carried by a collar 86 secured to the shaft 78. Thus the rod 71 may be locked to the shaft at the proper angle, so that when the wheel engages the paper, the wheel will also engage the paper with the proper pressure.

It must be understood that as far as the broader aspects of the invention are concerned, the counter may be disengaged from operation by any suitable means other than those herein shown, when the continuity of the paper in the winder is broken.

Having thus described my invention, what I claim as new and desire to secure by Letters Patent is:—

1. A device for measuring the length of a paper sheet delivered to a winder, including a freely rotatable counter wheel, a member supporting said counter wheel and rotatable about an axis eccentric with respect to the axis of rotation of said counter wheel, a braking mechanism including a brake shoe, and means automatically operable when the continuity of the sheet is broken in said winder, for moving the brake shoe into braking position to hold said counter wheel against rotation, and for moving said counter wheel about the axis of rotation of said member.

2. A paper measuring device including a counter wheel, means for yieldably urging said counter wheel into contact with the paper to frictionally rotate said wheel at a peripheral speed equal to the linear speed of travel of said paper, a counter operable by said counter wheel, and means for automatically moving said counter wheel away from the path of travel of said material when the continuity of the paper near said counter wheel has been broken.

3. A device for measuring the length of a sheet of continuously moving paper which is being wound up, including a counter wheel, means for yieldably urging said counter wheel towards the periphery of a drum which aids in supporting the roll and which serves to rotate said roll to effect winding operation, said wheel being in contact with the paper to frictionally drive said wheel at a peripheral speed equal to the linear speed of travel of said paper, a counter operated by said counter wheel, and means automatically operable when the continuity of the paper near said counter wheel has been broken, for braking said counter wheel against further rotation, and for moving said wheel away from the path of travel of said paper.

4. A device for measuring sheet material while it is being delivered to a winder to form a roll, including a freely rotatable counter wheel, means for supporting said counter wheel, and including a casing rotatable about an axis eccentric with respect to the axis of rotation of said counter wheel, a counter, power transmission means between said counter and said wheel for operating said counter from said wheel, a portion of said transmission means being enclosed in said casing, and means for moving said counter wheel about the axis of rotation of said casing and away from the path of the paper when the continuity of the material is interrupted.

5. A device for measuring the length of a paper sheet delivered to a winder, including a counter, a shaft for actuating said counter, a bracket mounted to oscillate about the axis of said shaft, a second shaft carried by said bracket, gearing connecting said shafts, a counter wheel carried by said second shaft, means for yieldingly pressing said counter wheel against the sheet to be measured, and means for swinging said bracket about the axis of said first shaft to disengage the counter wheel from the sheet when the continuity of the sheet near said counter wheel has been interrupted.

6. A device for measuring the length of a paper sheet delivered to a winder, including a counter, a shaft for actuating said counter, a bracket mounted to oscillate about the axis of said shaft, a second shaft carried by said bracket, gearing connecting said shafts, a counter wheel, and a brake drum carried by said second shaft, means for yieldingly pressing said counter wheel against the sheet to be measured, a brake shoe adjacent to said brake drum, and means for pressing said brake shoe against said brake drum to stop the latter and to push said counter wheel away from said shaft when the continuity of said sheet is interrupted.

7. A device for measuring the length of a paper sheet delivered to a winder, including a counter, a shaft for actuating said counter, a bracket mounted to oscillate about the axis of said shaft, a second shaft carried by said bracket, gearing connecting said shafts, a counter wheel carried by said second shaft, a weight normally tending to swing said bracket in one direction to press said counter wheel against the sheet, and a lever for swinging said bracket in the opposite direction when the continuity of the sheet is interrupted.

8. A device for measuring the length of a continuously advancing sheet, including a pivoted bracket, a shaft carried by said bracket and parallel to but spaced from the pivotal center of said bracket, a counter wheel carried by said shaft and adapted to engage with the sheet, a bell crank lever pivoted to oscillate about the pivotal center of said bracket, and a brake shoe carried by one end of said lever and adapted to stop the rotation of said counter wheel and thereafter to push the counter wheel away from the sheet upon the swinging of said lever.

9. A device for measuring the length of a continuously advancing sheet, including a tubular support, a shaft extending through said support, a bracket mounted to oscillate on said support, a lever mounted to oscillate on said support, a counter wheel journaled on said bracket, and means carried by said lever for stopping the counter wheel and for pushing the counter wheel away from the path of the sheet upon the swinging of said lever.

10. A device for measuring the length of a continuously advancing sheet, including a counter wheel adapted to frictionally engage with the sheet and be rotated thereby, a brake shoe, and means for moving said brake shoe to first stop the counter wheel and thereafter move the counter wheel away from the path of the sheet.

11. A device for measuring sheet material while it is being delivered to a winder to form a roll, including a freely rotatable counter wheel adapted to engage with and be rotated by said sheet material, a member movable about an axis eccentric with respect to the axis of rotation of said counter wheel and carrying said counter wheel, a counter mounted independently of said member, power transmission means between said counter and said wheel and extending through said first mentioned axis for operating said counter from said wheel, and means for moving said counter wheel about said first mentioned axis and away from the path of the paper when the continuity of the paper is interrupted.

12. An apparatus for measuring the length of a paper sheet which is to be wound into a roll, including a pair of drums which support the roll of paper as it is being wound and serve to rotate said roll to effect the winding operation while permitting the axis of the roll to rise as the diameter increases, a counter wheel, means for yieldingly pressing said counter wheel toward one of said drums and against the portion of the moving layer of paper which is supported by and in contact with said drum to frictionally drive said wheel at a peripheral speed equal to the linear speed of travel of the paper, a counter operated by said counter wheel, and means automatically operable when the continuity of the paper near said counter wheel has been broken, for moving said counter wheel away from said drum to stop the rotation of said counter.

KARL SIEG.